(12) United States Patent
Linhart

(10) Patent No.: US 10,843,110 B2
(45) Date of Patent: Nov. 24, 2020

(54) FILTER OF A FILTER DEVICE FOR FILTERING FLUID AND FILTER HEAD OF A FILTER DEVICE

(71) Applicant: MANN+HUMMEL GmbH, Ludwigsburg (DE)

(72) Inventor: Jochen Linhart, Schwaikheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 339 days.

(21) Appl. No.: 15/893,809

(22) Filed: Feb. 12, 2018

(65) Prior Publication Data
US 2018/0229164 A1 Aug. 16, 2018

(30) Foreign Application Priority Data

Feb. 14, 2017 (DE) .......................... 10 2017 001 379

(51) Int. Cl.
*B01D 35/30* (2006.01)
*B01D 35/153* (2006.01)
(Continued)

(52) U.S. Cl.
CPC .......... *B01D 35/306* (2013.01); *B01D 27/08* (2013.01); *B01D 27/103* (2013.01); *B01D 27/106* (2013.01); *B01D 35/005* (2013.01); *B01D 35/153* (2013.01); *B01D 35/16* (2013.01); *B01D 2201/304* (2013.01); *B01D 2201/342* (2013.01); *B01D 2201/347* (2013.01); *B01D 2201/4092* (2013.01)

(58) Field of Classification Search
CPC .... B01D 27/08; B01D 27/103; B01D 27/106; B01D 35/005; B01D 35/153; B01D 35/306; B01D 2201/304; B01D 2201/342; B01D 2201/347; B01D 2201/4092; F02M 37/22; F02M 37/42
See application file for complete search history.

(56) References Cited

U.S. PATENT DOCUMENTS

2011/0036766 A1    2/2011  Monzie
2011/0303604 A1*  12/2011  McKenzie ............. B01D 27/08
                                                               210/350
(Continued)

FOREIGN PATENT DOCUMENTS

EP        1949950 A1    7/2008
JP      H11114328 A    4/1999

*Primary Examiner* — Patrick Orme
(74) *Attorney, Agent, or Firm* — James Hasselbeck

(57) ABSTRACT

A filter of a filter device has a filter housing with a connecting side provided with a connecting element for detachably connecting the filter to a filter head of the filter device by a rotational and/or insertion movement relative to an imaginary connecting axis of filter and filter head. The filter housing has an inlet for fluid to be purified and an outlet for purified fluid. An outer seal seals a connection of the filter with the filter head relative to the environment. The outer seal is circumferentially continuous relative to the connecting axis. A closure element is provided to close off, when the filter is connected to the filter head, a fluid drain in the filter head provided for draining fluid when removing the filter from the filter head. The outer seal is acting sealingly at least in radial direction relative to the connecting axis.

14 Claims, 2 Drawing Sheets

(51) Int. Cl.
  *B01D 27/10* (2006.01)
  *B01D 27/08* (2006.01)
  *B01D 35/16* (2006.01)
  *B01D 35/00* (2006.01)

(56) References Cited

U.S. PATENT DOCUMENTS

2012/0160756 A1   6/2012  Hirsch et al.
2012/0167534 A1   7/2012  Muenkel et al.
2012/0168365 A1\*  7/2012  Stifel .................. B01D 27/106
                                              210/232

\* cited by examiner

FILTER OF A FILTER DEVICE FOR FILTERING FLUID AND FILTER HEAD OF A FILTER DEVICE

TECHNICAL FIELD

The invention concerns a filter of a filter device for filtering fluid, with a filter housing in which at least one filter element is arranged, wherein the filter housing comprises a connecting side, wherein the filter housing at the connecting side comprises at least one filter-associated connecting element with which the filter by means of a rotational and/or insertion movement about an imaginary connecting axis can be detachably connected to a filter head of the filter device, at least one inlet for fluid to be purified, at least one outlet for purified fluid, at least one outer seal, which is circumferentially continuous relative to the connecting axis, for sealing the connection of the filter with the filter head relative to the environment, and at least one closure element for closing off at least one fluid drain in the filter head which is provided for draining fluid when removing the filter from the filter head.

Moreover, the invention concerns a filter head of a filter device for filtering fluid with at least one connecting section, wherein the at least one connecting section comprises at least one head-associated connecting element with which a filter by means of a rotational and/or insertion movement about an imaginary connecting axis can be detachably connected, at least one inlet line for fluid to be purified, at least one outlet line for purified fluid, at least one outer sealing surface, which is circumferentially continuous relative to the connecting axis, for sealing the connection of the filter with the filter head relative to the environment, at least one fluid drain for draining fluid when the filter is removed which can be closed off with at least one filter-associated closure element.

Moreover, the invention concerns a filter device with at least one filter head and at least one filter that is detachably connected to the filter head.

BACKGROUND OF THE INVENTION

EP 1 949 950 A1 discloses a filter cartridge for liquids which comprises a housing that outwardly delimits an inner volume. The inner volume contains a filter element. The filter element separates the inner volume into an upstream region and a downstream region. The housing comprises a bottom which delimits an inlet for liquids that communicates with the upstream region and an outlet for liquid that communicates with the downstream region. The filter cartridge comprises a closure means which is fastened to the bottom of the housing and which is embodied for closing off a drain channel when the filter cartridge is fastened to a carrier. Moreover, the cartridge comprises a circumferential outer seal.

SUMMARY OF THE INVENTION

It is the object of the invention to design a filter, a filter head, and a filter device of the aforementioned kind in which a requirement with regard to a tolerance compensation of the employed components relative to filter cartridges known from the prior art is lowered.

This object is solved according to the invention in that the at least one outer seal is acting sealingly at least in radial direction relative to the connecting axis. By the use of a radially acting outer seal, the seal can be guided, when removing the filter, in a sealing manner farther along a sealing surface that is extending axially while the fluid drain in the filter head is opened. The fluid can drain through the fluid drain from the filter while the at least one outer seal continues to seal and prevents thus that fluid can reach the environment. The radial sealing action is therefore functional across a certain axial movement path of the filter relative to the filter head. In case the filter is connected by means of a screw connection with the filter head, the radial sealing action can be functional over a plurality of screw turns.

According to the invention, no or only a minimal tolerance compensation is required in comparison to the filter cartridge known from the prior art in order to prevent that the sealing region relative to the environment is released before the fluid drain is opened.

The invention can be employed in connection with an internal combustion engine, in particular of a motor vehicle. It can also be used outside of automotive engineering, in particular in industrial motors. The invention can also be used independent of internal combustion engines in motor vehicles. The filter can be a filter for liquid fluid, in particular fuel, oil, water, urea solution or the like.

In an advantageous embodiment, at least one closure element can act, relative to the connecting axis, so as to close off radially and/or axially, in particular sealingly. In this way, the closure element can be realized depending on the configuration of the head-associate fluid drain.

An axially acting closure element can advantageously be designed so wide that a fluid drain opening in the filter head is completely covered. In this way, this fluid drain opening can be reliably sealed by means of the closure element.

Advantageously, the at least one closure element can be embodied to be radially acting. The at least one closure element can thus rest against a corresponding sealing surface that is radially oriented relative to the connecting axis. In this way, the at least one closure element when separating the filter from the filter head can sealingly glide along the corresponding sealing surface.

Advantageously, the at least one closure element can be interacting sealingly with a head-associated outer sealing surface. In this way, a separate sealing surface is not needed. The at least one fluid drain can be located inward of the at least one head-associated outer sealing surface in this context.

A section of the outer sealing surface associated with the at least one closure element can comprise a reduced axial extension relative to the connecting axis in comparison to a section of the outer sealing surface associated with the at least one outer seal. In this way, the at least one closure element, when removing the filter, can be moved earlier out of the region of the outer sealing surface than the at least one outer seal, so that the fluid drain is opened prior to the sealing action of the at least one outer seal being canceled.

Advantageously, the at least one closure element can be embodied in conjunction with the outer seal. In this way, the at least one closure element and the outer seal can be combined.

Advantageously, at least one closure element that is circumferentially continuous relative to the connecting axis can have a smaller diameter than the outer seal. In this way, the at least one closure element can be arranged radially inwardly of the outer seal relative to the connecting axis.

In a further advantageous embodiment, at least one outer seal and/or at least one closure element can be arranged, in particular in a one-piece or multi-part configuration, on a holding element. In this way, the at least one outer seal and/or the at least one closure element can be fastened in a simple way to the filter housing. Moreover, by appropriate selection of the at least one holding element, corresponding sealing forces can be introduced better in this way.

Advantageously, at least one holding element can be embodied as a holding ring. In this way, the at least one closure element and/or the at least one outer seal can be held circumferentially relative to the connecting axis.

In a further advantageous embodiment, the at least one closure element can be designed as a shaped seal. In this way, the at least one closure element can better close off the at least one fluid drain.

In a further advantageous embodiment, the at least one closure element can be continuous circumferentially. In this way, an expenditure in relation to guiding and/or positioning devices can be reduced for correctly positioning the at least one closure element for closing off the fluid drain.

In a further advantageous embodiment, the at least one closure element can be elastic. In this way, the at least one closure element can be adapted better to a corresponding sealing surface in order to have a sealing action improved.

Advantageously, the at least one closure element can comprise an elastomer or can be comprised of elastomer. In this way, an elastic closure element, in particular in the form of a seal, can be simply realized.

Moreover, the technical object is solved for the filter head according to the invention in that the at least one outer sealing surface comprises at least one directional component that is directed radially relative to the connecting axis. In this way, a corresponding radially acting outer seal associated with the filter can rest sealingly against the at least one outer sealing surface.

In an advantageous embodiment, at least one fluid drain can open at an axial end face, axial relative to the connecting axis, of the at least one connecting section and/or at least one fluid drain can open at a circumferential side, facing in radial direction relative to the connecting axis, of the at least one connecting section.

A closure element acting correspondingly in axial direction can rest in a closing manner against a fluid drain opening at an end face.

A radially opening fluid drain can open into an annular chamber which surrounds the at least one connecting section radially outwardly. The annular chamber can be viewed as part of the fluid outlet.

The radially opening fluid drain can open at a circumferential sealing surface that is provided in particular for contact of at least one outer seal of the filter. In this way, the fluid drain can be closed off with a radially acting closure element associated with the filter.

Also, the technical object is solved for the filter device according to the invention in that a filter according to the invention is connected with a filter head according to the invention.

In other respects, the features and advantages disclosed in connection with the filter according to the invention, the filter head according to the invention, and the filter device according to the invention and their respective advantageous embodiments apply correspondingly among each other and vice versa. The individual features and advantages can of course be combined with each other wherein further advantageous effects may result which go beyond the sum of the individual effects.

BRIEF DESCRIPTION OF THE DRAWINGS

Further advantages, features, and details of the invention result from the following description in which embodiments of the invention will be explained in more detail with the aid of the drawing. A person of skill in the art will expediently consider the features disclosed in combination in the drawing, the description, and the claims also individually and combine them to meaningful further combinations.

In the Figures, same components are provided with same reference characters.

DETAILED DESCRIPTION

Figure 1:
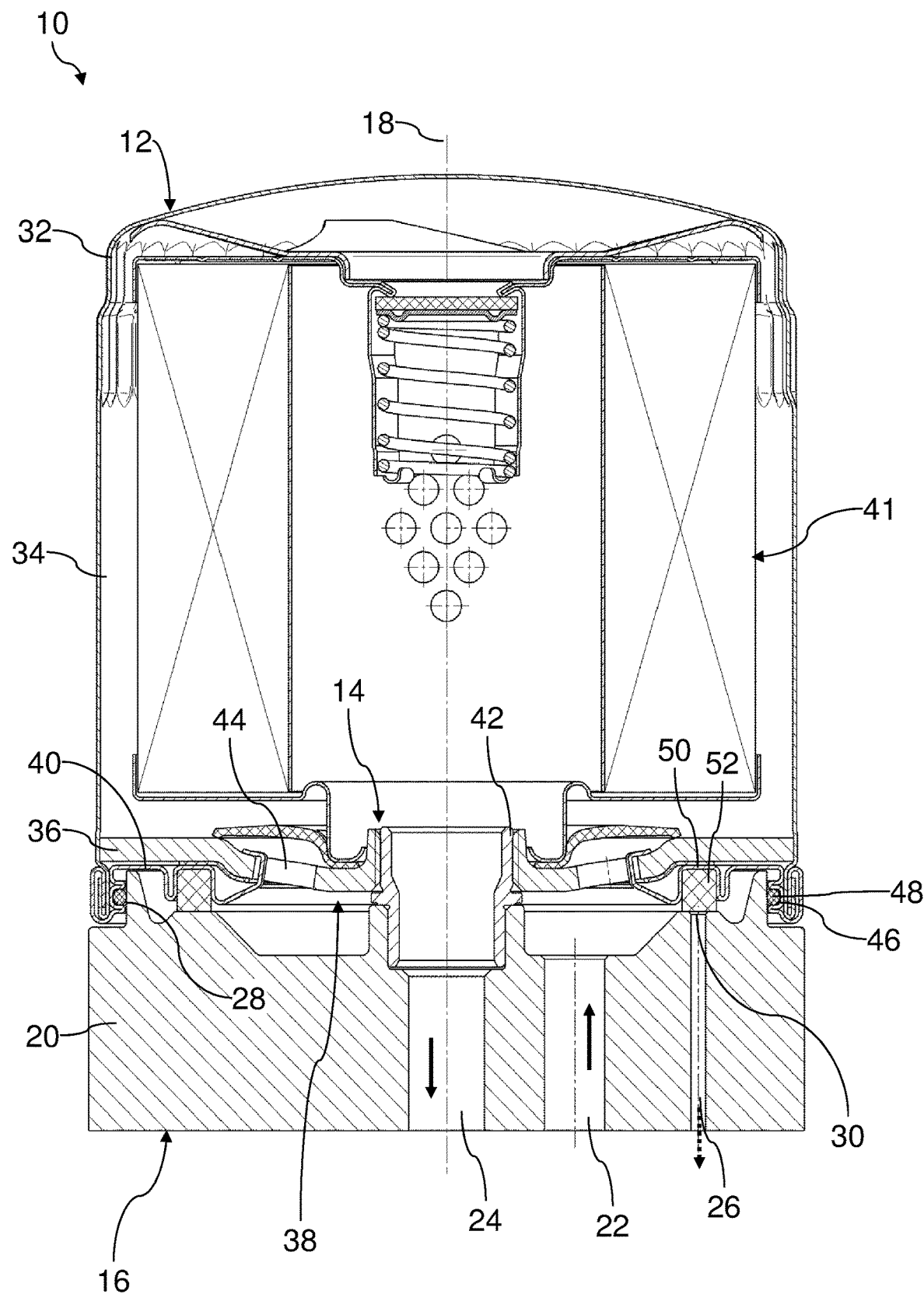
FIG. 1 shows a longitudinal section of a filter device according to a first embodiment, with a filter which is fastened by means of a screw connection detachably to the filter head.

In FIG. 1, a filter device 10 for fluid of an internal combustion engine, for example, motor oil or fuel, of a motor vehicle is shown in a longitudinal section according to a first embodiment.

The filter device 10 comprises a filter 12 which is fastened by means of a screw connection 14 detachably to a filter head 16 of the filter device 10. The filter head 16 is fixedly connected, for example, with a fluid-conducting system of the internal combustion engine. The screw connection 14 is connectable and again releasable by means of a corresponding rotation of the filter 12 about an imaginary connecting axis 18.

When in the following "radial", "axial", "coaxial", "circumferential" or the like is mentioned, this relates to the connecting axis 18, if nothing else is mentioned.

The filter head 16 comprises a connecting section 20 which comprises corresponding connecting element of the screw connection 14 in the form of a coaxial outlet socket with external thread. Moreover, the connecting section 20 comprises an inlet line 22 for fluid to be purified, an outlet line 24 for purified fluid, and a fluid drain 26 through which the fluid can drain from the filter 12 when removing the filter 12 from the filter head 16.

The outlet line 24 extends in an exemplary fashion coaxially to the connecting axis 18 and passes into the outlet socket. The inlet line 22 is located radially outwardly relative to the outlet line 24. The fluid drain 26 is located radially outwardly relative to the inlet line 22.

Moreover, the connecting section 20 comprises an outer sealing surface 28 which extends circumferentially continuously and in axial direction in the region of an axial end face of the connecting section 20 inside a shoulder provided thereat. The outer sealing surface 28 is oriented outwardly in radial direction. The outer sealing surface 28 surrounds the inlet line 22, the outlet line 24, and the fluid drain 26 radially outwardly and serves for sealing the fluid-conducting regions of the filter device 10 relative to the environment. The axial fluid drain 26 comprises a fluid drain opening 30 at the axial end face of the connecting section 20.

The filter 12 is a so-called spin-on filter. It comprises a filter housing 32 with a housing pot 34 and a housing cover 36. The housing cover 36 closes off the housing pot 34 at an axial end face connecting side 38. The housing cover 36 is connected to the housing pot 34 by means of an annular holding element 40, for example, a correspondingly bent sheet metal ring. The holding element 40 is connected by means of a crimped connection with the rim of the housing pot 34. In the filter housing 32, a filter element 41 for filtering the fluid is arranged that is embodied in an exemplary fashion as a so-called round filter element.

The housing cover 36 comprises a coaxial connecting opening 42. The radial inner rim of the housing cover 36 which surrounds the connecting opening 42 comprises an inner thread which can be screwed onto the exterior thread of the head-associated connecting socket. The connecting opening 42 serves also as an outlet for purified fluid from the filter 12.

Radially outwardly of the connecting opening 42, the housing cover 36 has a plurality of inlets 44 for fluid to be purified.

In the region of the crimped connection with the housing pot 34, the holding element 40 comprises an external receiving groove 46 for a circumferentially continuous outer seal 48. The outer receiving groove 46 is open in radial direction inwardly. The outer seal 48 is sealingly resting inwardly in radial direction against the outer sealing surface 28. The outer sealing surface 28 projects past the outer seal 48 in axial direction when the filter 12 is mounted.

Radially inwardly of the receiving groove 46, the holding element 40 comprises an inner receiving groove 50. In the inner receiving groove 58, a closure element 52 is arranged. The inner receiving groove 50 and the closure element 52 extend circumferentially continuously. The inner receiving groove 50 is open at the side which is axially facing the filter head 16. The closure element 52 is realized as an annular seal of an elastomer. When the filter 12 is connected, the closure element 52 in axial direction is sealingly resting at the fluid drain opening 30. The closure element 52 projects past the fluid drain opening 30 in radial direction outwardly and in radial direction inwardly, i.e., is wider than the fluid drain opening 30 when viewed in radial direction.

When unscrewing the filter 12 from the filter head 16, first the closure element 52 moves away from the fluid drain opening 30 in axial direction and opens it. Fluid contained in the filter 12 and corresponding fluid-conducting regions between the filter 12 and the filter head 16 can drain through the fluid drain 26. During the first turn of the filter 12, the outer seal 46 glides in axial direction along the outer sealing surface 28 and secures in this way the sealing action relative to the environment. In this way, the fluid can drain from the filter 12 without fluid reaching the environment.

Figure 2:
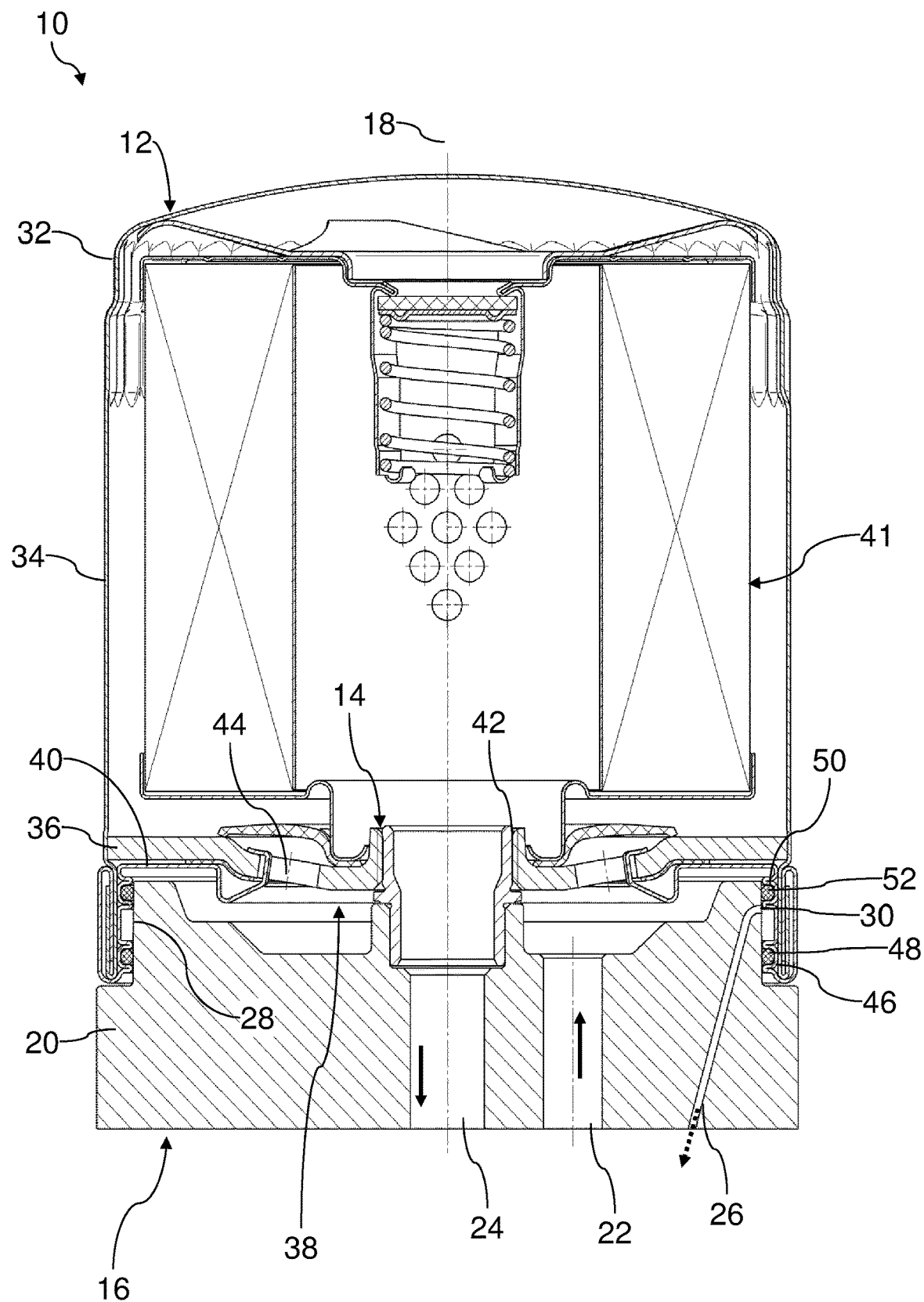
FIG. 2 shows a longitudinal section of a filter device according to a second embodiment.

In FIG. 2, a second embodiment of a filter device 10 is illustrated. Those elements which are similar to those of the first embodiment of FIG. 1 are provided with the same reference characters. The second embodiment differs from the first embodiment in that the fluid drain opening 30 is located in the outer sealing surface 28, i.e., the radially outward circumferential side of the connecting section 20. The outer sealing surface 28 is correspondingly sized larger in axial direction than in the first embodiment.

Moreover, the inner receiving groove 50 in the second embodiment is arranged in the region of the circumferential wall of the housing pot 34. It is located axially between the outer receiving groove 46 and the housing cover 36. The inner receiving groove 50 is open in radial direction inwardly. The closure element 52 is embodied as an O-ring. The closure element 52 is sealingly resting in radial direction inwardly against the outer sealing surface 28. When the filter 12 is mounted, the fluid drain opening 30 is located axially between the closure element 52 and the outer seal 48. As a whole, the section of the holding element 40 extending circumferentially and axially is wider in axial direction in comparison to the first embodiment.

In the second embodiment, the circumferential fluid drain 26 is closed in that the closure element 52 closes off an annular space between the outer sealing surface 28 and the circumferentially extending and axially extending section of the holding element 40, into which the fluid drain opening 30 opens, relative to a fluid-conducting region in the interior of the filter device 10.

An axial spacing between the closure element 52 and the fluid drain opening 30 is smaller than an axial spacing between the outer seal 48 and the fluid drain opening 30. In this way, when unscrewing the filter 12, first the closure element 52 can release the connection between the annular space and the fluid-conducting region in the interior of the filter device 10 so that the fluid contained therein can drain through the fluid drain 26. Only after further unscrewing of the filter 12, the outer seal 48 separates also from the outer sealing surface 28.

While specific embodiments of the invention have been shown and described in detail to illustrate the inventive principles, it will be understood that the invention may be embodied otherwise without departing from such principles.

What is claimed is:

1. A filter of a filter device for filtering fluid, the filter comprising:
   a filter housing comprising:
      a housing pot having an axially extending circumferentially closed outer wall which radially surrounds a housing interior, the housing pot having an open axial end face;
      wherein axial, as used herein, is a direction parallel to a connecting axis of the filter;
      where radial, as used herein, is a direction transverse to the axial direction;
      a housing cover arranged at and closing off the open axial end face of the housing pot, the housing cover arranged at a connecting side of the filter housing;
   wherein the connecting side of the filter housing includes
      at least one connecting element configured to detachably connect, by a detachable connection, the filter to a filter head of the filter device by a rotational and/or insertion movement relative to the connecting axis of the filter and the filter head;
   at least one filter element arranged inside housing interior of the filter housing;
   wherein filter housing further comprises:
      at least one inlet for fluid to be purified and
      at least one outlet for purified fluid;
      wherein the axially extending circumferentially closed outer wall continues axially outwardly beyond the housing cover, such that the housing cover is recessed inwardly from the open axial end face of the housing pot into an interior of the axially extending circumferentially closed outer wall;
   at least one outer seal arranged on a radially inner surface of the axially extending circumferentially closed outer wall of the housing pot, the at least one outer seal configured to seal in a radial inward direction against a radially outer side of the filter head,
   wherein the at least one outer seal forms a detachable connection of the filter with the filter head relative to an environment,
   wherein the at least one outer seal is circumferentially continuous relative to the connecting axis;
   at least one drain closure seal configured to seal against the filter head and close off at least one fluid drain in the filter head, when the filter is fully connected to the filter head,
   wherein the at least one drain closure seal is circumferentially continuous relative to the connecting axis;

wherein the at least one fluid drain is provided to drain fluid from the filter when removing the filter from the filter head;
wherein, when removing the filter from the filter head, the at least one drain closure seal opens the at least one fluid drain before the at least one outer seal unseals from the filter head, such that the at least one outer seal continues to seal the filter with the filter head relative to the environment while fluid drains from the filter.

2. The filter according to claim 1, wherein
the at least one closure seal is acting to close off the at least one fluid drain in the radial direction relative to the connecting axis; in an axial direction relative to the connecting axis; or in the radial direction and the axial direction relative to the connecting axis.

3. The filter according to claim 2, wherein
the at least one closure seal is sealingly acting to close off the at least one fluid drain in the radial direction relative to the connecting axis; in the axial direction relative to the connecting axis; or in the radial direction and the axial direction relative to the connecting axis.

4. The filter according to claim 1, further comprising
a holding element disposed at the housing,
wherein the at least one outer seal is arranged at the holding element.

5. The filter according to claim 1, further comprising
a holding element disposed at the housing,
wherein the at least one closure seal is arranged at the holding seal.

6. The filter according to claim 1, further comprising a holding element, wherein the at least one outer seal and the at least one closure seal are arranged at the holding element.

7. The filter according to claim 1, wherein
the at least one closure seal is elastic.

8. A filter device comprising:
a filter according to claim 1;
a filter head comprising
at least one connecting section comprising
at least one inlet line for fluid to be purified and
at least one outlet line for purified fluid,
the at least one connecting section further comprising
at least one connecting element,
wherein the at least one connecting element of the filter and the at least one connecting element of the filter head are detachably connected to each other to form a detachable connection of the filter and the filter head by a rotational and/or insertion movement about an imaginary connecting axis;
wherein the at least one connecting section of the filter head further comprises
at least one outer sealing surface that is circumferentially continuous relative to the connecting axis and comprises
at least one directional component which is directed radially relative to the connecting axis;
wherein the at least one outer seal is acting sealingly at least in a radial direction relative to the connecting axis sealing radially inwardly against a radially outer side of the the at least one outer sealing surface to seal the detachable connection of the filter with the filter head relative to an environment;
wherein the
at least one closure seal of the filter closes off the at least one fluid drain of the at least one connecting section of the filter head provided for draining fluid when removing the filter from the filter head.

9. The filtering device according to claim 8, wherein
the at least one drain closure seal is arranged on an exterior side of the housing cover, the at least one drain closure seal arranged radially inwardly from the at least one outer seal and surrounds the at least one inlet for fluid to be purified and the at least one outlet;
wherein the housing cover presses the at least one drain closure seal against a drain opening of the at least one fluid drain to seal the at least one fluid drain.

10. The filtering device according to claim 8, wherein
the at least one drain closure seal is arranged on the radially inner surface of the axially extending circumferentially closed outer wall of the housing pot, and positioned between the at least one outer seal and the housing cover;
wherein a drain opening of the at least one fluid drain is arranged on a radially outer surface of the at least one connecting section of the filter head, the drain opening positioned between the at least one drain closure seal and the at least one outer seal;
wherein the axially extending circumferentially closed outer wall of the housing pot presses the at least one drain closure seal radially inwarldly against the at least one connecting section of the filter head to seal against the drain opening of the at least one fluid drain to seal the at least one fluid drain.

11. A filter head of a filter device for filtering fluid, the filter head comprising:
at least one connecting section comprising
at least one connecting element configured to detachably connect by a detachable connection the filter head with a filter by a rotational and/or insertion movement about an imaginary connecting axis of the filter and the filter head;
the at least one connecting section comprising
at least one inlet line for fluid to be purified and
at least one outlet line for purified fluid;
the at least one connecting section further comprising
at least one outer sealing surface that is circumferentially continuous relative to the connecting axis and is configured to seal the detachable connection of the filter with the filter head relative to the environment;
the at least one connecting section further comprising
at least one fluid drain configured to drain fluid from the filter when removing the filter from the filter head,
wherein the at least one fluid drain is configured to be closed off by at least one closure seal of the filter when the filter is connected to the filter head;
wherein the at least one outer sealing surface comprises at least one directional component which is directed radially relative to the connecting axis,
wherein, when removing the filter from the filter head, the at least one outer sealing surface is configured to remain sealingly engaged at least one outer seal of the filter such that at least one drain closure seal of the filter opens the at least one fluid drain before the at least one outer seal unseals from the filter head, such that the at least one outer seal continues to seal the filter with the filter head relative to the environment while fluid drains from the filter.

12. The filter head according to claim 11, wherein
the at least one fluid drain opens at an axial end face of the at least one connecting section,
wherein the axial end face is facing in an axial direction relative to the connecting axis.

13. The filter head according to claim 11, wherein
the at least one fluid drain opens at a circumferential side of the at least one connecting section, wherein the circumferential side is facing in a radial direction relative to the connecting axis.

14. The filter head according to claim 11, wherein the at least one fluid drain includes
   an axial fluid drain that opens at an axial end face of the at least one connecting section,
   wherein the axial end face is facing in an axial direction relative to the connecting axis, and further includes
      a circumferential fluid drain that opens at a circumferential side of the at least one connecting section,
      wherein the circumferential side is facing in a radial direction relative to the connecting axis.

\* \* \* \* \*